Aug. 16, 1932.   W. A. CHRYST   1,871,958
SHOCK ABSORBER
Filed Aug. 2, 1929
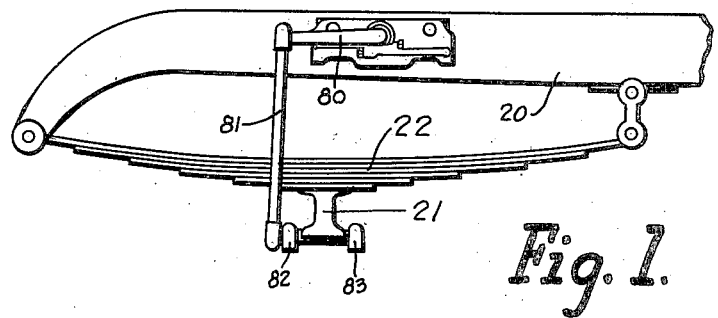
Fig. 1.
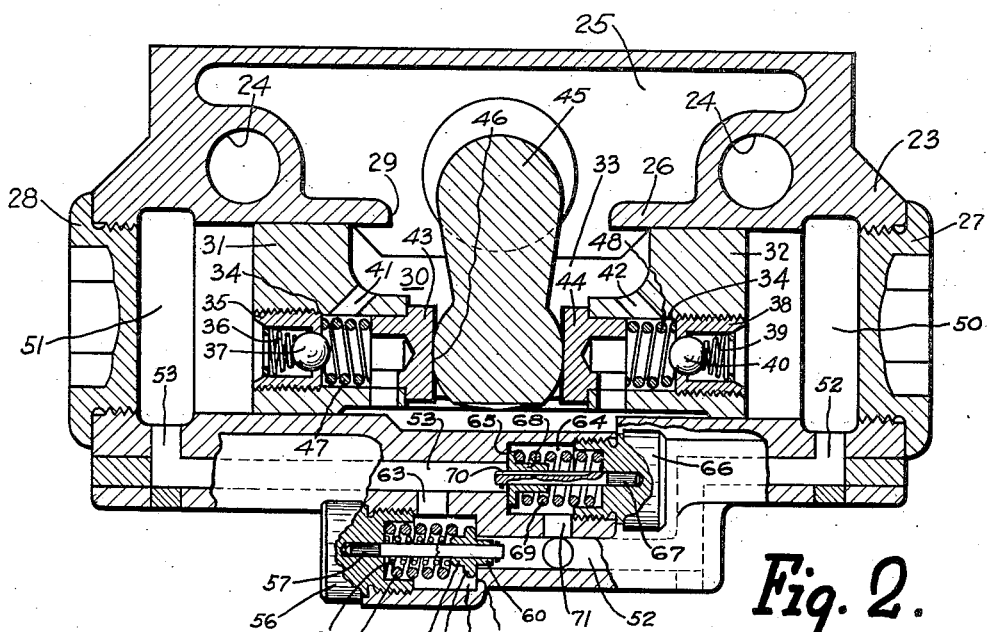
Fig. 2.
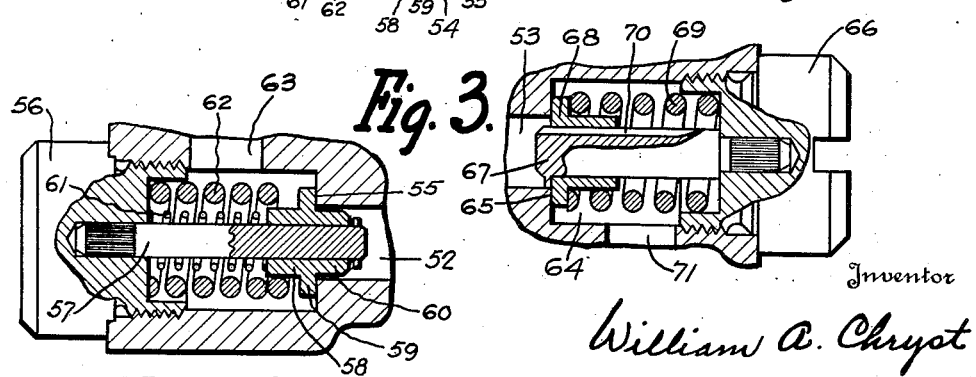
Fig. 3.
Fig. 4.
Inventor
William A. Chryst
By Spencer, Hardman and Jehn
His Attorneys Patented Aug. 16, 1932

1,871,958

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed August 2, 1929. Serial No. 383,050.

This invention relates to improvements in hydraulic shock absorbers particularly adapted to control the movements of vehicle springs.

It is among the objects of the present invention to provide a shock absorber of simple structure and design, capable of controlling both the approaching and separating movements of the frame and axle of a motor vehicle.

Further objects and advantages of the present invention will be apparent from the following description, reference being had to the accompanying drawing wherein a preferred embodiment of one form of the present invention is clearly shown.

In the drawing:

Fig. 1 is a side view of a portion of a vehicle chassis having a shock absorber secured thereto which is equipped with the present invention.

Fig. 2 is a longitudinal sectional view taken through the center of the cylinders of the shock absorber, a portion of the housing including the relief valve mechanism, being broken away to show the interior structures.

Fig. 3 is an enlarged, fragmentary sectional view showing the check valve for controlling vehicle spring compression movements.

Fig. 4 is a view similar to Fig. 3, illustrating the check valve for controlling spring rebound movements.

Referring to the drawing, the numeral 20 designates the frame of the vehicle, supported on the axle 21 by vehicle springs 22, only one of which is shown.

The shock absorber comprises a casing 23 provided with apertures for receiving bolts by which the shock absorber is secured to the frame 20 of the vehicle. Casing 23 presents the fluid reservoir 25 and a cylindrical portion 26, the ends of the cylindrical portion being closed by the cover caps 27 and 28 respectively. Opening 29 provides communication between the fluid reservoir 25 and the intermediate portion of the cylinder 26.

Within the cylinder there is provided a fluid displacement member 30 comprising piston portions 31 and 32 connected together in spaced relation by a web 33 running substantially longitudinally of the cylinder. Each piston portion 31 and 32 has a longitudinal passage 34, the end of each passage adjacent the outer edge of each piston portion being provided with screw threads. Within the screw threaded portion of the passage 34 of piston 31 there is provided a valve cage 35 having a valve seat. A spring 36 urges a ball check valve 37 normally into engagement with the valve seat of the valve cage 35. The screw threaded outer end of the passage 34 in piston portion 32 has a cylindrical valve cage 38 providing a valve seat, a spring 39 urging the ball check valve 40 normally into engagement with the valve seat of cage 38. In the piston head portion 31, a passage 41 leads from the fluid reservoir into the interior of the passage 34; a similar passage 42 leads from the reservoir into the passage 34 in piston head portion 32. A wear piece 43 comprising a head portion and a shank portion has its shank portion fitting into the passage 34 of the piston head portion 31, the head of said wear piece engaging with the inner wall of the piston head portion. A similar wear piece 44 fits into the passage 34 of piston head portion 32, the head portion for this wear piece engaging the inner end of said piston head portion.

A lever 45 has a shaft portion journalled in the casing so that the lever 45 is oscillatably supported within the casing and more particularly within the reservoir portion of the casing. The lever 45 has a ball end 46 which extends between the wear pieces 43 and 44 of the respective piston portions 31 and 32. A spring 47 is provided in the passage 34 of the piston portion 31. One end of the spring engages the valve cage 35, the other end of the spring engages the inner end of the shank of wear piece 43, said spring urging the wear piece 43 into engagement with the ball end 46 of the lever 45. A similar spring 48 is interposed between the wear piece 44 and the valve cage 38 of piston portion 32 and urging said wear piece 44 into engagement with the ball end 46 of the lever 45. These springs 47 and 48 in urging their respective wear pieces 43 and 44 respectively against the oscillatable lever 45 compensate for any wear of either the wear pieces or the lever.

The valves heretofore described comprising ball check valves 37 and 40 provide oppositely acting fluid replenishing valves in the piston portions 31 and 32 respectively of the fluid displacement member. When the fluid displacement member 30 moves to increase the cubical contents of the spring rebound control chamber 50 by moving toward the left as regards Fig. 2, any necessary fluid may flow from the fluid reservoir through the passage 42 of the piston portion 32 into the passage 34 and thus past the check valve 40 through valve cage 38 into the compression chamber 50. When the fluid displacement member 30 moves toward the right as regards Fig. 2 whereby to increase the cubical contents of the spring compression control chamber 51, then fluid may flow from reservoir 25 through passage 41 into passage 34 and thence past valve 37 through cage 35 into the said compression chamber.

Each compression chamber 50 and 51 has a separate duct 52 and 53 leading respectively from it. Duct 52 is provided with a valve chamber 54 which presents a valve seat 55. The one end of the valve chamber is closed by screw plug 56 supporting a valve pin 57, the free end of which extends into the duct 52 as shown in Fig. 2 when the plug 56 is screwed into position into the valve chamber 54. The valve 58 is slidably supported upon the valve stem 57, said valve 58 comprising a flange portion 59 adapted to engage with the valve seat 55 and a cylindrical extension 60 adapted to extend into the duct 52 as shown in Fig. 2. A spring 61 is interposed between the screw plug 56 and the valve 58 normally urging the valve 58 so that its annular flange 59 engages the valve seat 55. Another spring 62, of lesser length than the spring 61 but of greater tension, is interposed between the screw plug 56 and the valve 58, one end of the spring 62 being spaced about the valve flange 59 when the other end engages the plug 56 so that movement of the valve 58 from the valve seat 55 is necessary before the valve engages the spring 62 and has the tension of the spring 62 added thereto to resist movement of the valve portion 60 from the duct 52. The valve portion 60 is of such a length that it will still continue into the duct 52 when the valve flange 59 has engaged with the end of the spring 62 so that the movement of the valve 58 to withdraw its portion 60 from the duct 62 will be resisted by both springs 61 and 62. A port 63 connects the valve chamber 54 with the duct 53.

The port 53 communicates with the valve chamber 64, presenting a valve seat 65. A screw plug 66 closes the outer end of valve chamber 64 and supports a valve pin 67, the inner end of which extends into the duct 53. A valve 68 is slidably supported on the valve stem 67, a spring 69 interposed between the valve 68 and the screw plug 66 normally urging the valve 68 to shut off communication between the duct 53 and the valve chamber 64. The valve pin 67 has a groove 70 which provides a constantly restricted communication between duct 53 and the valve chamber 64. Valve chamber 64 is connected with the duct 52 through a passage 71.

As has been mentioned heretofore, lever 45 has a shaft portion journalled in the casing 23. The portion of the lever journalled in the casing extends outside the casing and has the shock absorber operating arm 80 provided thereon, the free end of which has one end of connecting link 81 swivelly secured therein. The other end of the link 81 is secured to a bracket 82 which is attached to the axle 21 by the clamping member 83 so that movement of the axle 21 will be transmitted to the shock absorber operating arm 80 through the link 81.

When an obstruction in the roadway causes the vehicle wheels, not shown, to compress the springs 22, or more particularly move them toward the frame 20, the link connection 81 will rotate the shock absorber operating arm 80 clockwise, thus the lever 45 will be moved clockwise and consequently the fluid displacement member 30 will be moved to the left as regards Fig. 2. Fluid within the spring compression control chamber 51 will have a pressure exerted thereon, which pressure will be exerted through the duct 53 upon the valve 68. Slight movements of the spring on the compression stroke, will cause fluid to escape through the groove 70 in the pin 67 into the valve chamber 64 and thence through passage 71 into duct 52 and into the rebound control chamber. Upon more extended movement of the spring 22 toward the frame, or on its compression stroke, piston 31 will be moved more extensively to compress its fluid within the compression control chamber 51, the pressure therein, after having reached a proper value, moving valve 68 against the effect of spring 69 away from its valve seat 65 and thus establishing an additional flow of fluid from the compression control chamber 51 through duct 53, past valve 65 into valve chamber 64 and thence through passage 71 and duct 52 into the rebound control chamber 50. It may be seen that pressures within the duct 53 are directed through passage 63 upon the relief side of valve 58, tending more tightly to press it upon its seat.

As soon as the spring 22 has reached the limit of its flexure caused by this particular obstruction, it will tend to return to normal position with a sudden, rebounding movement which, if not prevented, will result in undesirable jars and jolts being transmitted to the frame 20. The present device, as soon as the spring 22 starts to return toward normal position, will be so operated that the fluid displacement member 30 will be moved toward the right, thus causing its piston portion 32 to exert a pressure upon the fluid in the spring rebound control chamber 50, which pressure after having reached a predetermined value and being exerted upon the valve 58, will move said valve against the effect of spring 61 so that its flange 59 is moved out of engagement with the valve seat 55 and a fluid flow is established from duct 52 through the metering space between valve portion 60 and the wall of duct 52 past the valve flange 59 into the valve chamber 54 and thence through passage 53 and duct 63 into the spring compression control chamber 51. Upon an increase in fluid pressure within the spring rebound control chamber 50, which increase may result from more extensive movement of the piston portion 32, the valve 58 will be moved into engagement with the spring 62 and against the effect of both springs 61 and 62 so that the metering portion 60 of said valve 58 will be pushed entirely out of the duct 52, thereby decreasing the restriction to the flow of fluid therethrough in accordance with the increased pressure on the fluid in the chamber 50.

In order to vary the characteristics of the shock absorber so that it may be adapted for use in connection with various types of vehicle springs, or in order to obtain different riding qualities, the groove 70 in the pin 67 may be varied in size, or the tension and length of springs 61 and 62 or 69 may be altered. Springs of greater tension and a groove 70 of lesser dimensions will provide a stiffer ride than will springs of lesser tension and a groove 70 of greater dimensions. The provision of springs 47 and 48 acting upon the wear pieces 43 and 44 respectively will compensate for wear and thus tend to eliminate noisy operation of the shock absorber.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing presenting a fluid reservoir and a cylinder portion; a fluid displacement member in said cylinder providing a compression chamber in each end thereof, said member comprising two pistons connected together in spaced relation by an intermediate web portion; a passage through each piston longitudinally of the cylinder; a check valve in each piston passage comprising a valve cage secured in the outer end of its respective piston passage, a ball check valve within said valve cage; a wear piece fitting into the inner end of each passage; a lever supported by the casing and extending between the piston portions of the fluid displacement member; and a spring in each piston passage, interposed between the valve cage and the wear piece therein, said springs urging the respective wear pieces into engagement with the said lever.

2. A shock absorber comprising, in combination, a casing presenting a fluid reservoir and a cylinder portion; a fluid displacement member in said cylinder providing a compression chamber in each end thereof, said member comprising two pistons connected together in spaced relation by an intermediate web portion; a passage through each piston longitudinally of the cylinder; a check valve in each piston passage, one check valve operating opposite to the other, each valve comprising a valve cage secured in the outer end of its respective piston passage, and a ball check valve normally urged into closing position by a spring retained within the valve cage; a wear piece in each piston, each wear piece comprising a head portion and a shank portion the latter extending into the respective piston passage; an oscillatable lever supported within the casing and extending between the wear pieces of the piston portions; and a spring in each piston passage interposed between the valve cage and the shank of the respective wear pieces of the pistons, said spring urging the respective wear pieces into engagement with the oscillatable lever.

3. A shock absorber comprising, in combination, a casing presenting a fluid reservoir and a cylinder portion; a fluid displacement member in said cylinder providing a compression chamber in each end thereof, said member comprising two pistons connected together in spaced relation by an intermediate web portion; a passage through each piston longitudinally of the cylinder; a check valve in each piston passage for establishing a flow of fluid from the fluid reservoir into the respective compression chambers in response to the movements of the respective piston portions to increase the cubical contents of their respective compression chambers, a wear piece supported in each piston, an oscillatable lever supported within the casing and extending between the wear pieces of the piston portions; a spring interposed between each wear piece of a piston portion and its respective check valve, said spring normally urging its wear piece into engagement with the oscillatable lever; and check valves interposed between the compression chambers and adapted to establish restricted fluid flows between the compression chambers in response to the movement of the piston portions to reduce the cubical contents of their respective compression chambers.

4. A shock absorber comprising, in combination, a casing providing a cylinder, a piston in said cylinder, said piston having a passage for the transfer of fluid therethrough; a piston actuator; a check valve in the piston passage, comprising a valve cage, a check valve and a spring normally urging said valve to close the passage; a wear piece fitting into one end of the piston passage; and a resilient member interposed between the valve cage and wear piece and urging the wear piece into constant engagement with the actuator.

In testimony whereof I hereto affix my signature.

WILLIAM A. CHRYST.